(12) United States Patent　(10) Patent No.: US 7,171,156 B2
Caffrey et al.　(45) Date of Patent: Jan. 30, 2007

(54) METHOD AND APPARATUS FOR TRANSMITTING AUDIO AND NON-AUDIO INFORMATION WITH ERROR CORRECTION

(75) Inventors: John Justin Caffrey, Indianapolis, IN (US); Norbert Joseph Rehm, III, Melbourne, FL (US); Sin Hui Cheah, Carmel, IN (US); Karl Lewis Friedline, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 183 days.

(21) Appl. No.: 10/486,472

(22) PCT Filed: Aug. 13, 2002

(86) PCT No.: PCT/US02/25676

§ 371 (c)(1),
(2), (4) Date: Jul. 19, 2004

(87) PCT Pub. No.: WO03/017275

PCT Pub. Date: Feb. 27, 2003

(65) Prior Publication Data

US 2004/0253925 A1　Dec. 16, 2004

Related U.S. Application Data

(60) Provisional application No. 60/312,033, filed on Aug. 13, 2001.

(51) Int. Cl.
*H04H 7/00*　(2006.01)

(52) U.S. Cl. ............... 455/3.06; 455/414.1; 455/414.4; 369/47.22; 369/47.28; 369/47.4; 369/47.33

(58) Field of Classification Search ............... 455/3.06, 455/414.4; 369/47.33, 47.22, 47.4, 124.14, 369/116

See application file for complete search history.

(56) References Cited

U.S. PATENT DOCUMENTS 4,761,692 A　8/1988　Yoshida et al. ............. 358/335

(Continued)

FOREIGN PATENT DOCUMENTS

CA　2192958　12/1995

(Continued)

OTHER PUBLICATIONS

Philips Semiconductors: "Data Sheet SAA7392, Channel encoder/decoder CDR60", Philips Semiconductors Preliminary Spec., Mar. 21, 2000, pp. 1-76.

(Continued)

*Primary Examiner*—Marceau Milord
(74) *Attorney, Agent, or Firm*—Joseph J. Laks; Robert D. Shedd; Paul P. Kiel

(57) ABSTRACT

A method and an apparatus for providing digital quality transmission of audio and non-audio information using low cost components and arrangement. The present invention provides for the transmission of the audio and non-audio transmission by first converting the data to conform to the CD standard format and conditioning the converted signal to thereby generate a conditioned EFM signal. The conditioned EFM signal is used to frequency modulate a carrier. By converting the audio and non-audio information to conform to the CD standard format, the present method provides a low cost means of transmitting the data with error detection and correction. Another aspect of the present invention relates to embedding the non-audio information in the SUBCODE block of the data frame according to the CD standard. The non-audio information may be unrelated to the audio information, and the audio and non-audio information may be transmitted to separate devices. Another aspect of the present invention relates to controlling a voltage controlled oscillator in response to the fill level of a file buffer in the decoder.

18 Claims, 5 Drawing Sheets

U.S. PATENT DOCUMENTS

| | | | |
|---|---|---|---|
| 5,394,259 A | 2/1995 | Takahara | 359/142 |
| 5,587,979 A | 12/1996 | Bluthgen | 369/32 |
| 5,731,923 A * | 3/1998 | Sakuma | 360/69 |
| 5,799,042 A | 8/1998 | Xiao | 375/285 |
| 5,808,224 A | 9/1998 | Kato | 84/609 |
| 5,856,962 A * | 1/1999 | Inagawa et al. | 369/47.19 |
| 5,859,821 A * | 1/1999 | Koya et al. | 369/30.25 |
| 5,936,917 A * | 8/1999 | Min | 369/30.27 |
| 5,960,398 A * | 9/1999 | Fuchigami et al. | 704/270 |
| 5,982,816 A | 11/1999 | Ogita et al. | 375/240 |
| 6,018,506 A * | 1/2000 | Okabe et al. | 369/30.23 |
| 6,055,216 A * | 4/2000 | Shintani | 369/47.31 |
| 6,170,060 B1 | 1/2001 | Mott et al. | 713/201 |
| 6,208,445 B1 | 3/2001 | Reime | 359/146 |
| 6,229,769 B1 * | 5/2001 | Packer | 714/769 |
| 6,233,213 B1 * | 5/2001 | Okada et al. | 369/59.12 |
| 6,256,303 B1 | 7/2001 | Drakoulis et al. | 370/344 |
| 6,707,784 B2 * | 3/2004 | Sako et al. | 369/275.3 |
| 6,829,211 B2 * | 12/2004 | Sako et al. | 369/275.3 |
| 6,980,498 B2 * | 12/2005 | Sako | 369/47.24 |

FOREIGN PATENT DOCUMENTS

| | | |
|---|---|---|
| DE | 4422015 | 8/1995 |
| EP | 909112 | 4/1999 |
| WO | 00/23899 | 4/2000 |
| WO | 00/76272 | 12/2000 |

OTHER PUBLICATIONS

Philips Semiconductors: "Data Sheet, SAA7325, Digital servo processor and Compact Disc decoder with integrated DAC (CD10 II)", Philips Semiconductors Product Spec., Jun. 26, 2000, pp. 1-68.

K. C. Pohlmann: "The Compact Disc Technology and Formats: Applications", Journal of the Audio Engineering Society, NY,NY, vol. 36, No. 4, Apr. 1, 1988, pp. 250-253, 256-25-4, 276-280, 282.

* cited by examiner

METHOD AND APPARATUS FOR TRANSMITTING AUDIO AND NON-AUDIO INFORMATION WITH ERROR CORRECTION

This application claims the benefit, under 35 U.S.C. § 365 of International Application PCT/US02/25676, filed Aug. 13, 2002, which was published in accordance with PCT Article 21 (2) on Feb. 27, 2003 in English and which claims the benefit of U.S. patent application No. 60/312,033, filed Aug. 13, 2001.

BACKGROUND OF THE INVENTION

1. Field of the Invention.

The present invention relates to an apparatus and method for transmitting audio and non-audio information, and in particular, to an apparatus and method for transmitting audio and non-audio data with built-in error correction to ensure high quality reception and reproduction of the audio and non-audio information.

2. Description of the Related Art.

Recent developments have enabled users to store a large amount of digitally encoded audio information in a centralized location for easy retrieval and playback. For example, it has become relatively common for a user to "rip" a CD and convert the digital information stored therein to a compressed format, such as MP3, and store the MP3 files onto a hard disk drive of a personal computer. Utilizing such a method, a very large number of audio files can be stored on a single hard disk drive. For example, MP3 encoding at a rate of 128 Kbps corresponds to approximately 1 minute per megabyte of storage, and thus, a 20 GB hard disk can store approximately 20,000 minutes of music. The stored files can then be organized, retrieved, and played back using any one of a plurality of commercially available programs, for example, Musicmatch. The stored files may also be downloaded to a portable player or a portable storage medium, such as a CompactFlash card.

However, there are some limitations to listening to audio files when the files are being processed and played back from a centralized device such as a personal computer. Generally, the user must be in the vicinity of the computer's speakers to listen to the audio files as they are retrieved, processed, and outputted by the computer. Peripheral devices, such as an audio receiver, may be attached to the central device by means of a cable for play back at a remote location, but such a solution may require very long cables, or that the cables be run through walls, and thus, may be impractical. Alternatively, it is known to attach a wireless transmitter to the personal computer, or similar device, to transmit the audio information from the personal computer to a receiver device having speakers attached thereto. However, such transmitters generally utilize traditional analog methods, wherein the personal computer decodes the audio file, processes the decoded file to provide an output audio signal, and the output signal modulates a carrier signal. At the receiver end, the received output audio signal is demodulated to recover the output audio signal, which is used to drive a set of speakers. Such a method is susceptible to the problems associated with analog transmissions, such as interference, and reduced fidelity caused by poor reception.

In that regard, traditional analog methods of transmitting audio information can provide for low cost delivery and reception, but such methods do not offer the fidelity, noise immunity and error correction capability associated with digital transmission and processing methods. Digital modulation/transmission methods, for example, QPSK and FSK, may offer superior performance, but generally requires more expensive components and configurations to implement.

Furthermore, analog methods of transmitting the audio information generally do not easily provide for embedding non-audio information. into the audio information. For example, a compressed audio file, such as an MP3 file, may include non-audio information related to the audio information. The MP3 files include an ID3 tag portion that may include information about the artist, album, etc. It is difficult to transmit this information at the same time with the audio information using analog transmission methods. Additionally, it may be desirable to transmit non-audio information unrelated to the audio information, for example, sports scores, weather information, stock quotes, and the like, along with the audio information.

Therefore, it is desirable to provide a low cost method for transmitting audio information in a manner that provides the benefits of a digital transmission methods. It is further desirable to provide a low cost method for transmitting audio information that includes error detection and/or correction to provide CD-quality reproduction of the audio information.

It is further desirable to provide a low cost method for transmitting audio and non-audio information in a manner that provides the benefits of digital transmission, wherein non-audio information may or may not be related to the transmitted audio information. The non-audio information may be related to the audio information to provide information about, for example, the artist, album, etc. The non-audio information may be unrelated to the audio information to provide general information, for example, sports scores, weather information, stock quotes, or the like.

It is further desirable to provide a method for controlling a decoder associated with a receiving unit for implementing the digital quality transmission in order to prevent an empty or overflow condition in a file buffer associated with the decoder.

BRIEF SUMMARY OF THE INVENTION

The present invention overcomes the difficulties noted above by providing a low cost method and apparatus for transmitting audio and non-audio information, which provide the benefits of digital transmission methods, using analog transmission methods. The method according to the present invention eliminates the problems noted above that are associated with analog audio transmissions. More specifically, the method according to the present invention provides built in error detection and correction and the ability to embed non-audio information with the audio information.

More specifically, in the method according to the present invention, the audio and non-audio information is converted to a PCM format, if necessary, and then converted to a format that conforms to the Red Book CD standard. As mentioned herein, the Red Book CD standard refers to the standard set forth in "Compact Disc Digital Audio—System Description," published February 1987, by Sony/N.V. Philips, and contained in EEC BN 15-83-095 and IEC Publication 908. The converted data is provided in the form of an EFM signal, which is then signal conditioned to fundamental sinusoidal frequencies and used to modulate a carrier. At the receiving end, the received signal is demodulated to recover the conditioned EFM signal, which is then decoded to derive the original digital bitstream. In this manner, the present invention provides the benefits of built in error detection and/or correction and the ability to derive the original digital bitstream for further processing and presentation using analog transmission methods.

In one aspect, the present invention is a method for transmitting audio information, comprising the steps of: generating a digital bitstream representative of the audio information; formatting the digital bitstream to comprise a plurality of data frames; generating error correction bits associated with the respective frames, and embedding the error correction bits into the respective frames; interleaving the data frames; EFM encoding the bitstream to generate an EFM signal; conditioning the EFM signal to thereby limit the signal to sinusoidal modulation waves, and modulating a carrier signal using the conditioned EFM signal. In particular, the formatting, generating, interleaving, and EFM encoding steps comprise, formatting, generating, interleaving, and EFM encoding the bitstream to generate a Red Book CD standard compliant signal.

In another aspect, the present invention is a method for transmitting audio information comprising the steps of formatting, generating error correction bits, interleaving, and EFM encoding the bitstream to generate a Red Book CD standard compliant signal, receiving non-audio digital data, and embedding the non-audio digital data in the SUBCODE block of the data frames generated in accordance with the Red Book CD standard, conditioning the resulting signal, and modulating a carrier with the resulting signal.

In another aspect, the present invention is a method for receiving and processing audio information transmitted via a wireless channel, comprising the steps of: receiving an audio signal via a wireless channel; demodulating the received audio signal to recover a conditioned EFM signal; decoding the conditioned EFM signal to generate a data bitstream comprising a plurality of data frames; deinterleaving the data in the data frames to generate a plurality of deinterleaved data frames; performing error correction in response to error correction codes included in the respective data frames; and D/A converting the resulting bitstream to generate an analog output signal. In particular, the demodulating, decoding, deinterleaving, and error correcting steps comprise demodulating, decoding, deinterleaving, and error correcting in accordance with the Red Book CD standard.

In another aspect, the present invention is a method for receiving and processing audio and non-audio information comprising the steps of demodulating, decoding, deinterleaving, and error correcting the received signal in accordance with the Red Book CD standard, extracting non-audio digital data from a SUBCODE block of a data frame derived from the received signal.

In another aspect, the present invention is a method for receiving and processing audio and non-audio information comprising the steps of demodulating, decoding, deinterleaving, and error correcting the received signal in accordance with the Red Book CD standard, and providing a file buffer for temporarily storing the received bitstream during the demodulating, decoding, deinterleaving and error correcting steps, wherein the file buffer provides a PWM signal representative of the fill level in the file buffer and a voltage controlled oscillator associated with a decoder is controlled in response to the PWM signal representative of the fill level in the file buffer.

BRIEF DESCRIPTION OF THE DRAWINGS

The above mentioned and other features and objects of this invention, and the manner of attaining them, will become more apparent and the invention itself will be better understood by reference to the following description of an exemplary embodiment of the invention taken in conjunction with the accompanying drawings, wherein.

Corresponding reference characters indicate corresponding parts throughout the several views.

DETAILED DESCRIPTION OF THE INVENTION

The embodiment disclosed below is not intended to be exhaustive or limit the invention to the precise form disclosed in the following detailed description. Rather, the embodiment is chosen and described so that others skilled in the art may utilize its teachings.

Figure 1:
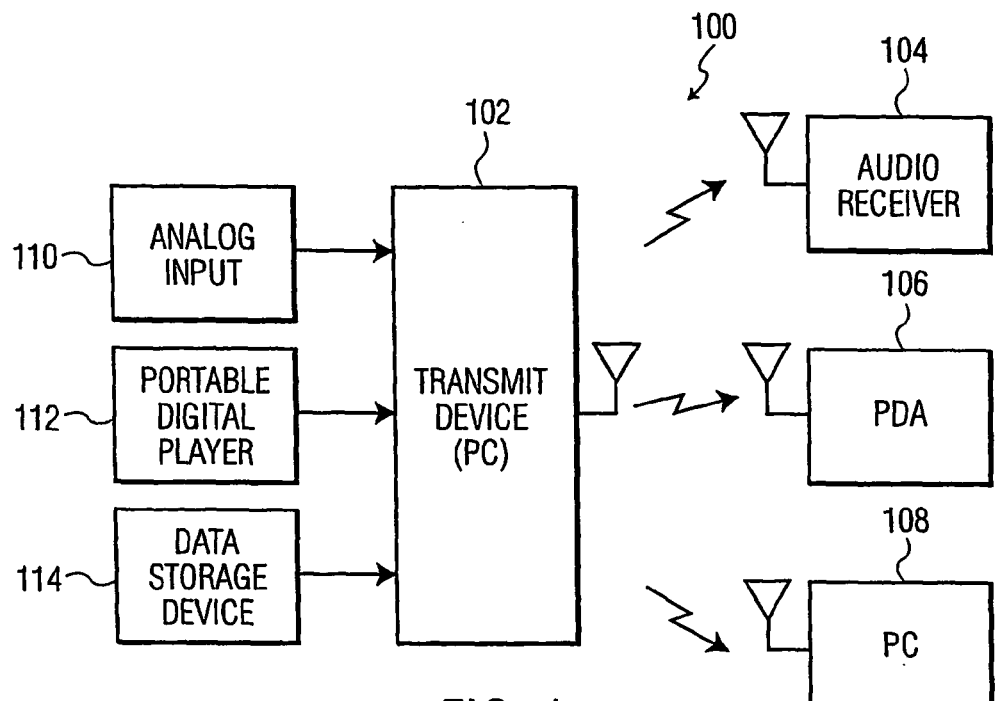
FIG. 1 is a block diagram of a system utilizing the method for transmitting and receiving audio and non-audio data according to the present invention.

FIG. 1 shows a block diagram illustrating a system according to the present invention wherein the audio data, and certain non-audio data is transmitted from transmitting device 102 to various devices as desired. Transmitting device 102 includes the transmitting unit described in detail further below for wirelessly transmitting the audio and non-audio information according to the present invention. Each receiving device of FIG. 1 includes a receiving unit described in detail further below for receiving and processing the data transmitted according to the present invention. Briefly, the transmitting unit converts the selected data to conform to the Red Book CD standard, conditions the resulting signal, and modulates a carrier using the conditioned signal. The conditioned signal is similar to the filtered signal derived from a disc in a CD player. The receiving unit demodulates the received signal to recover the formatted data from the carrier and performs processing on the data in a manner that conforms to the CD standard. This method enables the audio information to be transmitted in a low cost manner while at the same time providing the benefits of digital methods of transmission, reception and reproduction. Additionally, this method takes advantage of the CD data format to allow non-audio information, which may be unrelated to the audio information, for example, sports scores, weather information, stock quotes, or the like, to be embedded within and transmitted with the audio data.

Figure 2:
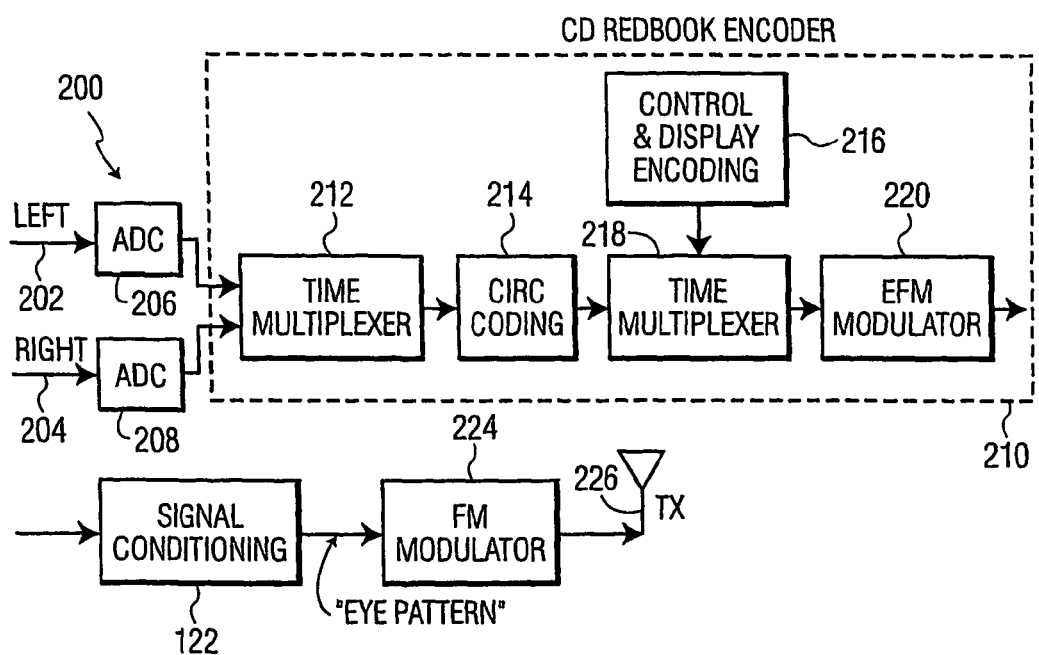
FIG. 2 is a block diagram of a transmitting unit according to the present invention.

The transmitting device may be any device, for example, a personal computer, having processing and transmitting capability, either hardware or software, to implement the functions of transmitting unit 200 of FIG. 2. In transmitting device 102, the audio and non-audio information may be received or retrieved from one of a plurality of data sources. The data sources may include, but is not limited to, an analog signal input 110, portable digital player 112 that is coupled to the personal computer, or a data storage device 114 that is incorporated within the personal computer, or is coupled to the personal computer using firewire, USB or other similar means. Alternatively, the data sources may incorporate transmitting unit 200, thereby directly transmitting the data to the receiving devices without going through the PC.

Figure 3:
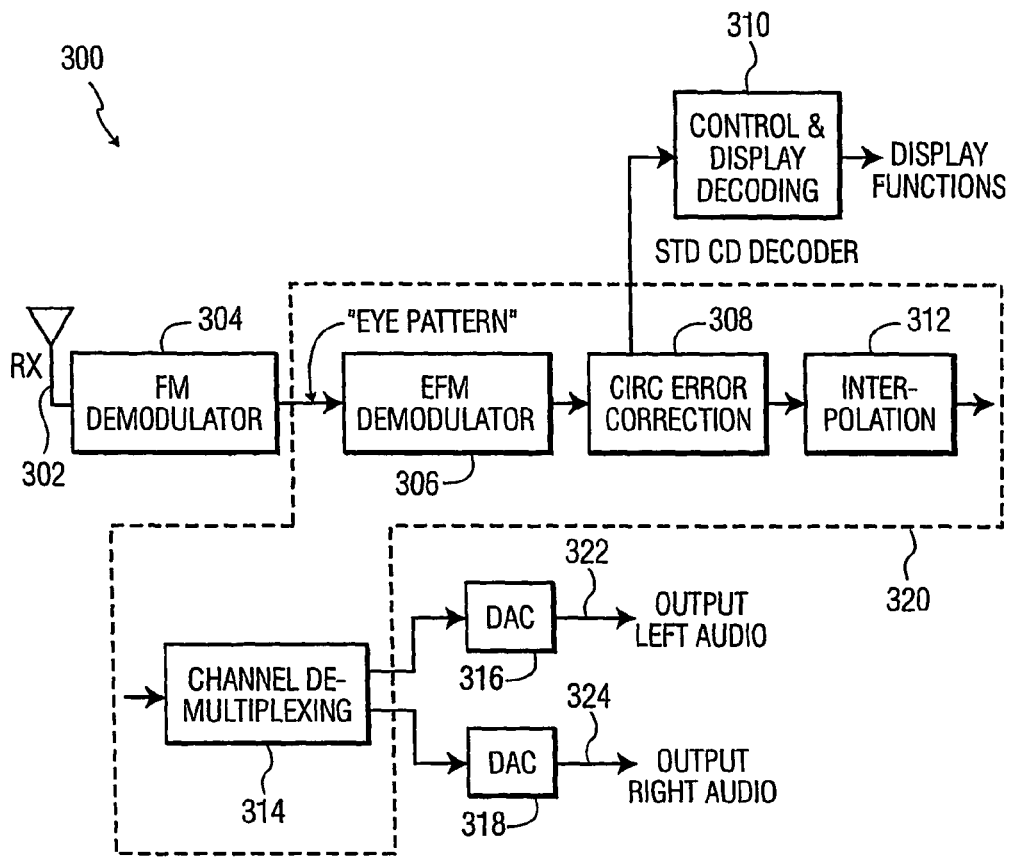
FIG. 3 is a block diagram of a receiving unit according to the present invention.

The transmitted audio and non-audio information is received, processed and/or presented by one or more receiving devices having a receiving unit, or elements that can perform the functions of receiving unit 300, shown in FIG. 3. The receiving devices may comprise, for example, audio receiver 104 that includes a set of speakers attached thereto for presenting the received audio information, a PDA 106 capable of receiving and presenting the received audio and non-audio information, and a second personal computer 108. Each of the receiving devices includes a receiving unit 300, or elements to implement the functions of receiving unit 300, described further below to implement the receiving and processing method according to the present invention. In this manner, system 100 allows a user to store and/or retrieve a large collection of audio files and non-audio information at a centralized location or device, and transmit the information to a remote device as desired.

FIG. 2 shows a block diagram of transmitting unit 200, which receives audio data through left channel 202 and right channel 204. In the present embodiment, the audio data is in analog form and is converted to digital form by analog to digital converters 206 and 208. The digital signals are applied to time multiplexer 212 to produce a single serial bitstream. Alternatively, the audio data may be received directly in digital form and applied directly to time multiplexer 212. The applied audio data is then converted as described below to comply with the standard Red Book CD format prior to transmission.

The conversion of the audio data to the standard Red Book CD format provides the advantages of providing robust error detection and correction, and allowing the conversion to be implemented using relatively low cost components since the components for encoding and decoding the data according to the Red Book CD format are well known and readily available. The present embodiment utilizes SAA 7392 manufactured by Philips Corporation to implement the conversion.

The process for converting the audio data to the Red Book CD format are well known by those skilled in the art. Briefly, the audio data is first converted to PCM format, wherein the signal is time sampled and amplitude quantized into a parallel binary number. The digital data is then processed to provide CIRC error correction encoding and eight fourteen modulation (EFM). Additionally, SUBCODE and synchronization words are added to the bitstream.

Figure 4:
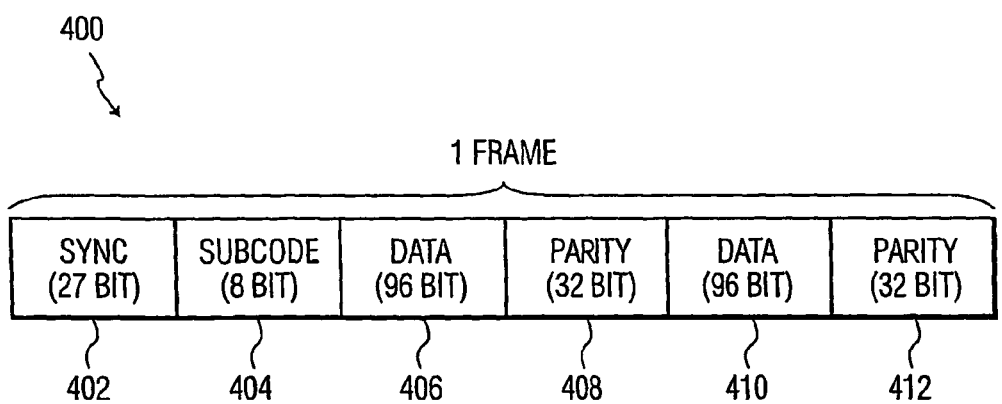
FIG. 4 is a diagram of a data frame according to the Red Book CD standard.

The data according to the Red Book CD format is grouped into frames, wherein each frame consists of 588 channel bits. The format of a frame before EFM modulation is shown in FIG. 4. As shown, each frame consists of a 27 bit synchronization portion 402, an 8 bit SUBCODE portion 404, a 96 bit data portion 406, a 32 bit parity portion 408, a second 96 bit data portion 410, and a second 32 bit parity bit portion 412. In assembling a frame, six 32 bit PCM audio sampling periods are grouped in a frame and each sampling frame is then divided to produce four 8 bit audio symbols. To scatter possible errors, the symbols from different frames are interleaved so that the audio signals from one frame originate from different frames. In addition eight 8 bit parity symbols are generated for each frame, four in the middle of the frame and four at the end of the frame. The interleaving of the frames and the generation of the parity frames provides the error correction encoding based on the Cross-Interleave Reed Solomon Code.

Once the frames have been assembled, the data is EFM encoded, wherein blocks of 8 bits are translated to blocks of 14 bit words using a table that assigns a particular 14 bit word to each 8 bit word. In the present invention, the assembly of the frame, including the interleaving of the data, the EFM encoding, and the addition of the SUBCODE and control bits, is performed by CD format encoder 210, which comprises CIRC encoder 214, control and display encoder 216, time multiplexer 218 and EFM modulator 220. Although an exemplary arrangement for converting the data is shown in FIG. 2, it is to be understood that the above functions and processes may be implemented with other various components and software elements known to those skilled in the art. The conversion results in an EFM signal, which is then conditioned to produce the modulating signal. The EFM signal is frequency band limited to sinusoidal fundamentals by the signal conditioning block 222 to simplify the subsequent frequency modulation stage whereby the "analog-like" signal will frequency modulate a carrier to transmit the audio and non-audio information to the receiver. In the present embodiment, the EFM signal is bandlimited between 180 kHz to 720 kHz. In accordance with the present invention, the conditioned EFM signal is used to modulate an RF carrier signal by FM modulator 224, which is coupled to antenna 226. In summary, the conditioned EFM signal, which is a representation of the digital audio and non-audio information to be transmitted, is generated using standard CD encoding and is then used to directly modulate a carrier for transmission by antenna 226, thereby providing for digital quality transmission using low cost elements and techniques.

FIG. 3 shows receiving unit 300 for receiving and processing the transmitted signal according to the present invention. Receiving unit 300 includes demodulator 304 that uses traditional analog frequency demodulation techniques to recover the modulation, which is then applied to decoder 320 to recover the digital, or "CD", quality signals. The CD decoder is nearly complementary to the CD encoding process of the transmitter and provides the functions of square pulse shaping, NRZ conversion, EFM demodulation, time-base correction, SUBCODE extraction, CIRC error detection/correction and error concealment. The built in error detection and/or correction associated with the data will help recover information which may have been corrupted by interference during transmission. In the present invention, the decoder comprises EFM demodulator 306, CIRC error correction unit 308, interpolator 312, and channel demultiplexer 314. Also, a concealment block may be included in demultiplexer 314. Audio output signals are provided through D/A converters 316 and 318. The control and display information, including the SUBCODE information, is provided through control and display decoder 310.

A significant advantage of the present method is that a digital error detection/correction technique is incorporated into the analog transmission, thereby ensuring accurate transmission and reception of the audio and non-audio data. Another advantage of the present invention is that the CD decoder functions may be easily implemented using a commercially available decoder such as SAA 7325 manufactured by Philips Corporation. An advantage of commercial decoders is the error concealment which removes/reduces audible artifacts when the error correction is stressed to the limit. Of course, the encoder/decoder functions may also be realized using software means as known by those skilled in the art.

According to another aspect of the present invention, non-audio information may be transmitted along with the audio information using the transmission technique described above. As mentioned above, the Red Book CD format includes an eight bit SUBCODE portion 404 embedded with the data frame. This SUBCODE portion is divided into 8 channels, P, Q, R, S, T, U, V, and W. The P and Q channels are intended for control information related to the audio data (lead-in, lead-out markers for audio tracks, copy protection flags, pre-emphasis flags, etc.). The 6 R–W channels were intended for audio-related information (such a cover art, artist information, etc.).

The present invention provides a method for using these 6 channels to transmit non-audio information, which may be unrelated to the audio information, to remote devices from a central transmitter device. As mentioned above, the transmitting device may be a PC, or an appliance that stores information, or receives information via a network, that the user wishes to transmit to a remote device. The invention is equally applicable to non-audio devices.

Generally, the SUBCODE portion of the EFM signal represents data which is additional to that needed for the audio information. However, according to the present invention, the SUBCODE portion may be used to transmit non-audio information that is unrelated to the audio information. For example, referring to FIG. 1, transmitting device 102 may be transmitting a bitstream according to the present invention wherein the bitstream includes audio information that is retrieved from a data storage device, such as a hard disk 104, and non-audio information, such as memos, calendar appointments/reminders, and news/weather/financial information (via an Internet connected application). The non-audio information may have been generated in response to user action at the transmitting device, or a user request transmitted through the receiving device. In this case, transmitted information is received and decoded by audio receiver 104 to extract the audio information and processed to provide digital quality playback of the transmitted audio information. The transmitted information is also received and decoded by PDA 106 to extract the relevant non-audio information to present the non-audio information to the user. In this manner, unrelated audio and non-audio information may be simultaneously transmitted, received, and processed by different receivers with the advantage of the high quality, error corrected transmission provided by the present method. The non-audio information embedded in the transmission may be presented immediately to the user, for example, a news alert, or may be stored in a memory device of the receiving device for later display or use, for example, a calendar entry.

The data structure of a SUBCODE block consists of 98 bytes, each byte consisting of a P bit, Q bit, R bit, S bit, T bit, U bit, V bit and a W bit. The present invention utilizes the six R–W bits of each byte sent for transport of the data, thus, bits 7-2 of first byte of data are transmitted in positions R–W of the first SUBCODE byte. Bits 1-0 of the first byte, and bits 7-4 of the second byte of data are transmitted in positions R–W of the second SUBCODE byte. Bits 3-0 of the second byte of data, and bits 7-6 of the third byte are transmitted in positions R–W of the third SUBCODE byte. Bits 5-0 of the third byte of data are transmitted in positions R–W of the fourth SUBCODE byte. This process is repeated for the remaining data, wherein 4 bytes of SUBCODE are used for every 3 bytes of data. The final 4 bits of the SUBCODE block are unused, thus in this example exactly 584 bits of the available space is used, corresponding to 73 bytes of data. These 73 bytes form one data packet. If data payload takes less than 66 bytes, the overall data packet may be reduced accordingly. Although the exemplary embodiment shows a single data packet residing in each SUBCODE block, alternative subdivisions of data packets are possible.

Utilizing this method, the present invention allows non-audio information, in addition to audio information, to be transmitted over radio frequencies (RF) with minimal increase in cost, compared to the cost of sending audio information only.

Figure 7:
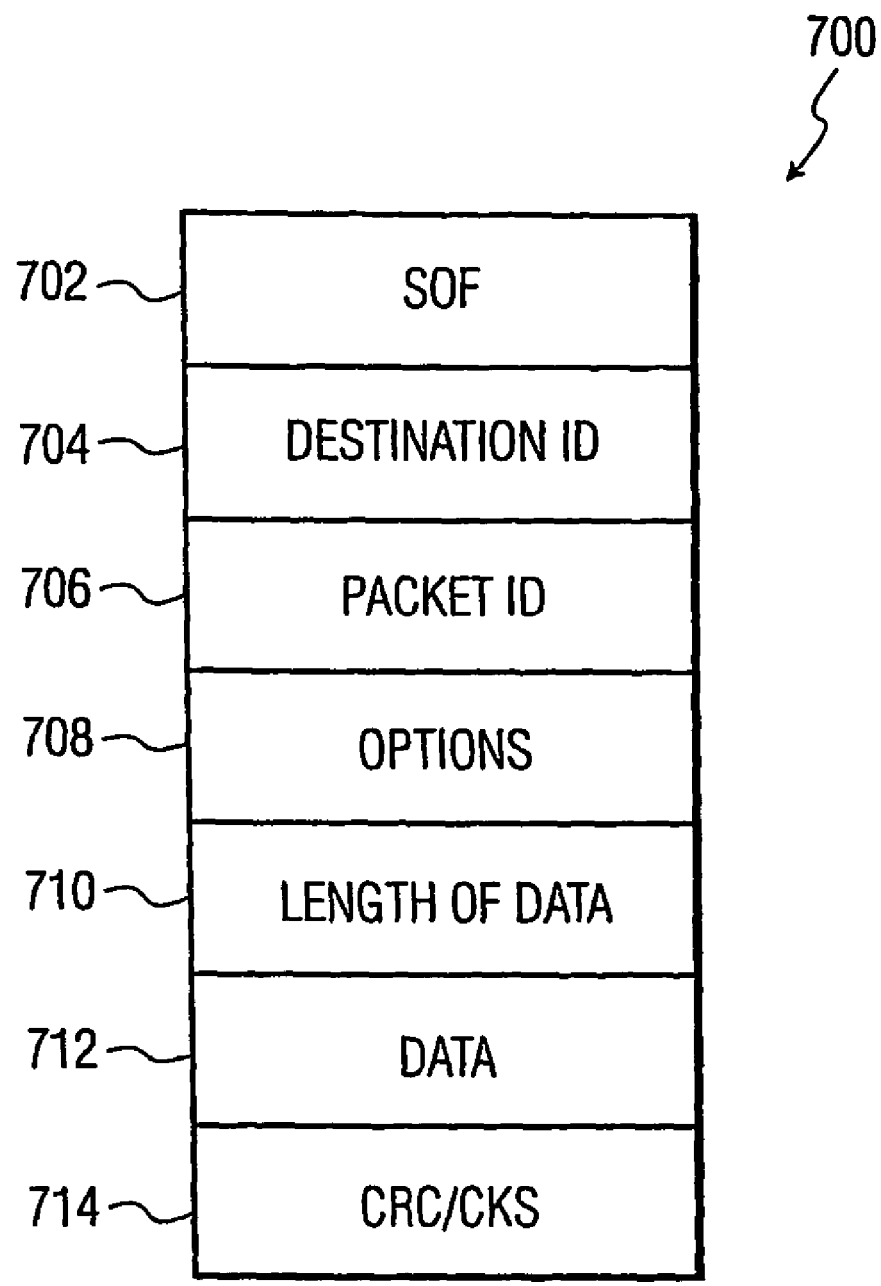
FIG. 7 is a diagram of a packet of information that is embedded in the SUBCODE block according to the present invention.

The data packet transmitted in the SUBCODE block uses the exemplary data structure 700 disclosed in the exemplary embodiment of FIG. 7. The start of frame (SOF) portion 702 is defined as oxas. Destination ID (DEST) portion 704 is defined a 0x00 for "broadcast mode", otherwise, it contains the destination ID of a particular receiving device. "Broadcast mode" is used for indiscriminate transmission to one or more receiving devices. PACKET ID portion 706 should be set to 0x0000 for initial packet sent, each packet is sent multiple times (the number of times being dependent on the expected quality of the RF transmission—this value may be high if there is an expectation that packets will be commonly corrupted—this value may be set lower if the environment is expected to be "error-free"). OPTIONS portion 708 includes bits 2-0, which indicate the Protocol Version, bit 3, which indicates ERROR CHECK SCHEME (1=CRC, 0=CKS), and bits 7-4 are reserved. LENGTH portion 710 indicates length in bytes of data portion 712 (including SOF 702 and CRC/CKS 714). This may, in the exemplary embodiment, have a maximum value of 73. The actual non-audio data to be transmitted is embedded in data portion 712. CKS/CRC portion 714 is used for CHECKSUM or CYCLIC REDUNDANCY CHECK. Using the packet format specified above, non-audio can be embedded and transmitted with the audio data using the method described above.

Figure 5:
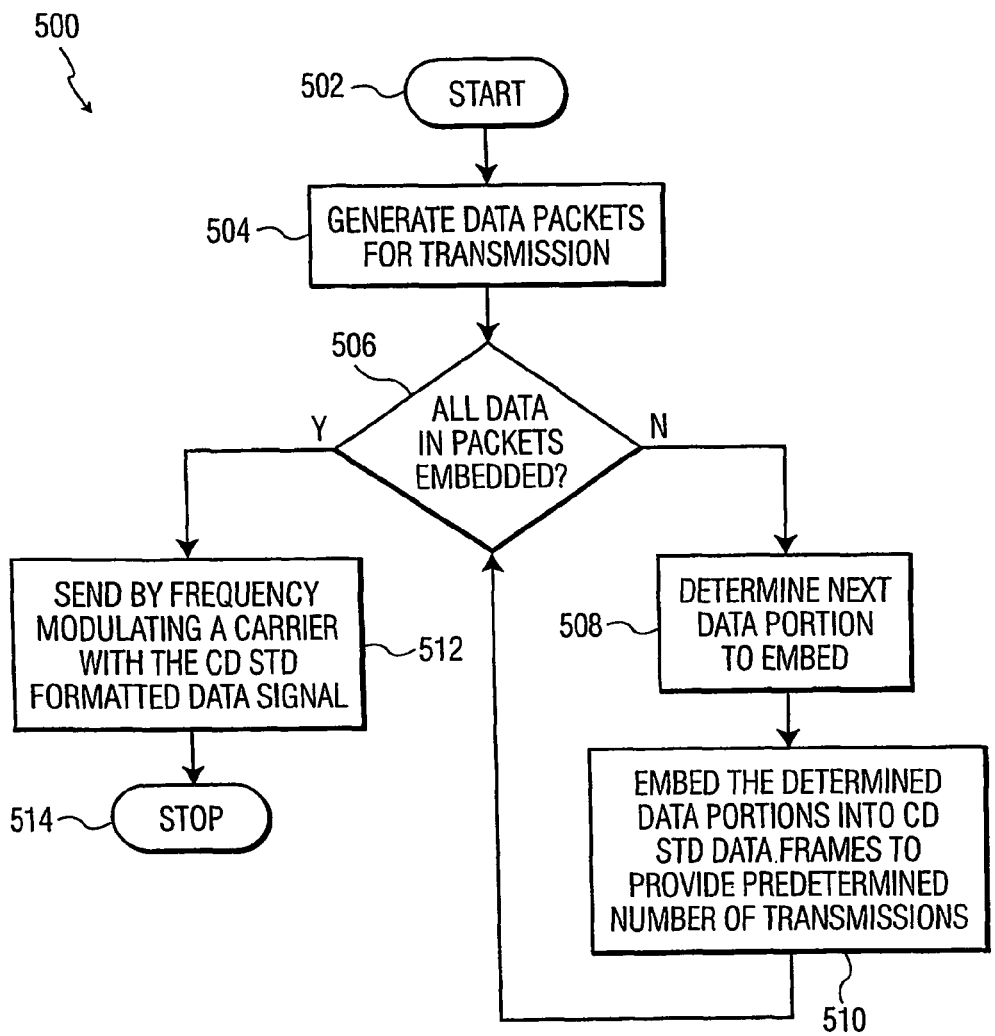
FIG. 5 is a flowchart diagram illustrating the steps for embedding and transmitting non-audio data according to the present invention.
Figure 6:
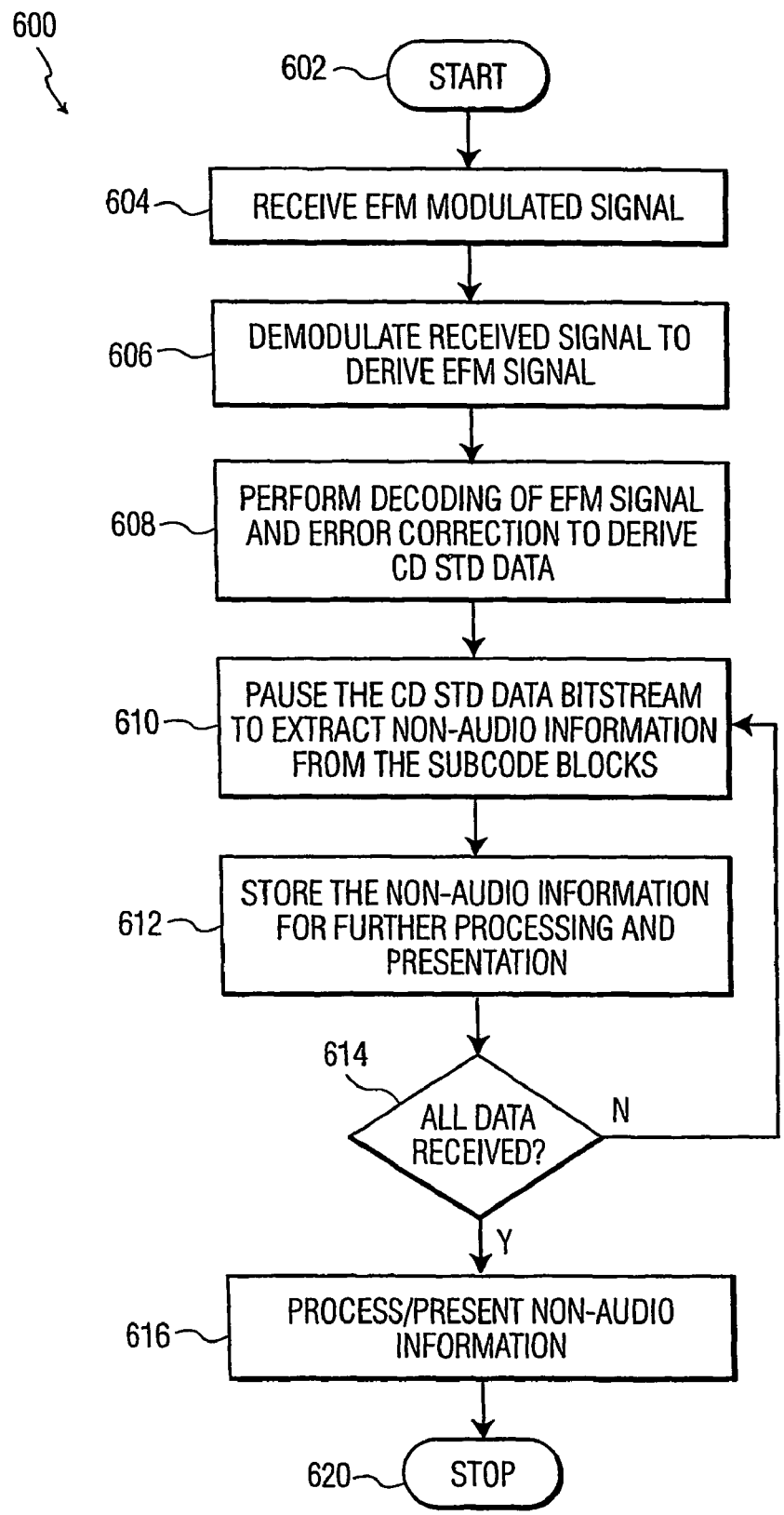
FIG. 6 is a flowchart diagram illustrating the steps for receiving non-audio data embedded in a bitstream according to the present invention.

The processes for transmitting and receiving the CD standard formatted data with non-audio information embedded therein are illustrated in FIGS. 5 and 6, respectively. Process 500 begins with generating the data packets to be transmitted in step 504. The data packets may be generated in response to a user input at the transmitting device, a user request from a peripheral device or automatically in response to a particular device set up. In step 506 it is determined whether all of the data to be transmitted has been embedded into the data frames according to the CD standard. Recall that 6 bits of the non-audio data are embedded into each data frame according to the CD standard. If all of the data has not been embedded, process 500 goes to step 508, which determines the next set of data bits to be embedded into the CD standard compliant data frames. In step 510, the next set of data bits determined in step 508 are embedded into the CD data frames the desired number of times. In this manner, the data packets may be repeatedly transmitted a predetermined number of times to ensure accurate reception. The packet ID ensures that the receiving unit identifies and processes each unique packet. Process 500 then returns to step 506 to repeat the process until all of the data has been embedded into the data frames. After all of the data in the non-audio data packets have been embedded, the process proceeds to step 512, wherein the conditioned EFM signal is generated and then used to frequency modulate a carrier as described above. Although in the present exemplary embodiment all of the non-audio data is first generated, then embedded and then transmitted, in sequence, it is to be understood that the non-audio data may be generated, embedded, and transmitted "on the fly." That is, the data may be generated, embedded, and transmitted simultaneously as the non-audio data is retrieved/received by the transmitting unit. Such an alternative may be advantageous for large data transmissions.

The process for receiving and decoding the non-audio data according to the present invention is shown in FIG. 6. Process 600 begins with receiving the FM signal that has been modulated with the EFM signal in step 604. In step 606, the receiving unit demodulates the received signal to recover the conditioned EFM signal, or the "eye pattern" signal. In step 608, the EFM signal is decoded and error corrected using standard CD signal decoding methods to derive a bitstream having the form of the data frames shown in FIG. 4. In step 610, the derived bitstream is parsed to extract the non-audio information from the SUBCODE block of the frames. In step 612, the extracted non-audio information is stored for further assembly and processing. In step 614, it is determined whether all of the relevant non-audio data has been received. If not, process 600 returns to step 610 to continue parsing the bitstream to extract the remaining non-audio information. If so, the process proceeds to step 616, wherein the received data may be processed and presented as desired. Although the present embodiment first extracts and collects all of the relevant non-audio information prior to processing and presentation, it is to be understood that these steps may be performed simultaneously. For example, when receiving and processing a large amount of data, the received data may be processed and presented as the data is received.

In the processes of FIGS. 5 and 6 each data packet is sent multiple times because an RF transmission cannot be expected to be 100% error free, and because there is no provision for a back channel that would allow requests for retransmission of data. This method relies on redundancy to overcome errors. For the exemplary embodiment, the transmitting device determines the precise number of retransmissions, independent of the receiving device. In alternative embodiments, it may be economically feasible to use a low cost back channel to have the receiver signal to the transmitter the desired number of retransmissions.

According to another aspect of the invention, a control signal generated based on the fill condition of the buffer is used to control the operation of the receiving unit. Specifically, a buffer (not shown) is used in the decoder of the receiving unit, in a manner known in the art, to temporarily store the received data In that regard, it is desirable to ensure that the buffer does not overflow or underflow. Generally, in CD playback devices, the decoder IC provides a PWM signal that is representative of the buffer used in processing the digital audio information. In a closed loop application, the PWM signal is used to increase or decrease the speed of the disk to allow continuous unbroken audio playback. If the PWM signal is not used in a closed loop application, the buffer may either run empty, resulting in a mute condition, or may overflow, resulting in the skipping over portions of the audio file.

It can be seen that the present invention is an open loop condition. To prevent the buffer overflow and underflow problems, the present invention uses the PWM signal to control the processing reference frequency of the EFM decoder. That is, the output of the EFM decoder IC provides a PWM signal, wherein the width of the PWM signal is representative of the status of the file buffer. If the PWM signal is 25% duty cycle, the file buffer is approximately 25% full; 50% duty cycle indicates that the file buffer is approximately 50% full, etc. This PWM signal is then capacitor rectified to a usable DC voltage level and applied to a voltage controlled oscillator ("VCO"). The output frequency of the VCO is the reference operating frequency of the EFM decoder IC. In the present embodiment the PWM signal is provided at an output pin of the SAA 7325. This signal is rectified and applied to the VCO of the decoder.

When the file buffer level falls below a predetermined level, for example, 50%, the rectified DC voltage also drops below a predetermined level, to thereby cause the frequency of the VCO to decrease. This decrease in the VCO causes a decrease in the reference operating frequency. Slowing down the reference operating frequency will allow the buffer to increase to the required 50% level. When the file buffer level increases to more than 50%, the output rectified DC voltage level will increase the VCO frequency, which increases the reference operating frequency, which decreases the level in the buffer to decrease to the desired 50% level. In this manner, the PWM signal from the EFM decoder is used to monitor the fill status of the file buffer and to control the processing speed of the EFM decoder. This prevents the out of synchronization conditions that may occur in the open loop condition. It is to be understood that this method is not only limited to an EFM decoder IC, and that any IC or circuit that supplies a PWM signal indicative of the fill status of the buffer can use this method to control the processing speed.

Thus, the present invention enables users to experience audio information currently available to at a centralized location or device, such as a PC, in a context removed from the centralized location or device. It is contemplated that other methods may be developed which may further augment and provide superior functionality. For example, the data in the PC may be wirelessly downloaded according to the present invention to a portable, hand held audio device, having a receiving unit according to the present invention incorporated therein, and stored in a hard drive of the hand held device for later playback to provide additional flexibility and portability. Additional alternative embodiments include incorporation into a clock radio, an integrated bookshelf audio system, an integrated portable player with built in remote, and an integrated spacemaker, all of which have a wireless link to a computing system.

It will be apparent to those skilled in the art that although the present invention has been described in terms of an exemplary embodiment, modifications and changes may be made to the disclosed embodiment without departing from the essence of the invention. As such, it is to be understood that the present invention is intended to cover all modifications as defined in the appended claims.

What is claimed is:

1. A method for wirelessly transmitting audio information, comprising the steps of:
   generating a digital bitstream representative of the audio information;
   formatting the digital bitstream to comprise a plurality of data frames;
   generating error correction bits associated with the respective frames, and embedding the error correction bits into the respective frames;
   interleaving the data frames;
   EFM encoding the bitstream to generate an EFM signal;
   conditioning the EFM signal to generate a conditioned signal comprising sinusoid modulation tones; and
   modulating a carrier signal using the conditioned EFM signal to thereby wirelessly transmit the audio information.

2. The method according to claim 1, wherein the formatting, generating, interleaving, and EFM encoding steps comprise, formatting, generating, interleaving, and EFM encoding the bitstream to generate a Red Book CD standard compliant signal.

3. The method according to claim 2, wherein the conditioning step comprises bandwidth limiting the EFM signal.

4. The method according to claim 2, further comprising the steps of:
- receiving non-audio digital data;
- embedding the non-audio digital data in the SUBCODE block of the data frames, wherein the error correction bits are used for error detection by a receiving unit.

5. The method according to claim 4, wherein the embedding step comprises embedding the non-audio digital data in a predetermined number of data frames.

6. The method according to claim 4, wherein the receiving step comprises receiving the non-audio digital data from a signal source different than audio information signal source.

7. The method according to claim 4, wherein the receiving step comprises receiving the non-audio digital data from the Internet.

8. The method according to claim 4, wherein the receiving step comprises receiving non-audio digital data that includes a destination ID associated with a particular one of a plurality of receiving units.

9. The method according to claim 4, wherein the embedding step comprises embedding 6 bits at a time of the non-audio digital data into each SUBCODE block of each data frame.

10. A method for receiving and processing audio information transmitted via a wireless channel, comprising the steps of:
- receiving an audio signal via the wireless channel;
- demodulating the received audio signal to recover a bandwidth limited EFM signal;
- decoding the EFM signal to generate a data bitstream comprising a plurality of data frames;
- deinterleaving the data in the data frames to generate a plurality of deinterleaved data frames;
- performing error correction in response to error correction codes included in the respective data frames;
- D/A converting the deinterleaved data frames to generate an analog output signal substantially free from transmission impairments.

11. The method according to claim 10, wherein the demodulating, decoding, deinterleaving, and error correcting steps comprise demodulating, decoding, deinterleaving, and error correcting in accordance with the Red Book CD standard.

12. The method according to claim 10, further comprising the step of
- extracting non-audio digital data from a SUBCODE block of a data frame, and wherein the error correction step consists of performing error detection in response to the error correction codes.

13. The method according to claim 12, further comprising the step of
- extracting a data packet from a plurality of SUBCODE blocks associated with a plurality of data frames.

14. The method according to claim 13, further comprising the step of extracting a destination ID from the extracted data packet, and processing the data packet in response to the destination ID.

15. The method according to claim 14, further comprising the step of storing the extracted data packet in a storage device in response to the destination ID.

16. The method according to claim 14, further comprising the step of displaying a predetermined display while presenting the audio information in response to the extracted data packet.

17. The method according to claim 10, further comprising the step of providing a file buffer for temporarily storing the received bitstream during the demodulating, decoding, deinterleaving and error correcting steps, wherein the file buffer provides a PCM signal representative of the fill level in the file buffer.

18. The method according to claim 17, further comprising the step of controlling a voltage controlled oscillator associated with a decoder in response to the PCM signal representative of the fill level in the file buffer, whereby the decoding rate of the received signal is controlled in response to the fill level of the file buffer.

* * * * *